United States Patent
Sato et al.

(10) Patent No.: US 9,272,704 B2
(45) Date of Patent: Mar. 1, 2016

(54) HYBRID VEHICLE HAVING BOOST CONVERTER AND CONTROL METHOD OF A HYBRID VEHICLE HAVING A BOOST CONVERTER

(71) Applicant: Toyota Jidosha Kabushiki Kaisha, Toyota-shi, Aichi-ken (JP)

(72) Inventors: Ryoji Sato, Toyohashi (JP); Masayoshi Suhama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/592,349

(22) Filed: Jan. 8, 2015

(65) Prior Publication Data
US 2015/0210267 A1    Jul. 30, 2015

(30) Foreign Application Priority Data
Jan. 27, 2014 (JP) ................. 2014-012828

(51) Int. Cl.

| | |
|---|---|
| *B60L 9/00* | (2006.01) |
| *B60W 20/00* | (2006.01) |
| *B60L 11/12* | (2006.01) |
| *B60L 11/08* | (2006.01) |
| *B60L 11/18* | (2006.01) |
| *B60W 10/06* | (2006.01) |
| *B60W 10/08* | (2006.01) |

(52) U.S. Cl.
CPC ............ *B60W 20/1088* (2013.01); *B60L 11/08* (2013.01); *B60L 11/12* (2013.01); *B60L 11/1803* (2013.01); *B60L 11/1814* (2013.01); *B60W 10/06* (2013.01); *B60W 10/08* (2013.01); *B60L 2210/14* (2013.01); *B60L 2210/42* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2007/0187158 A1* | 8/2007 | Muta et al. .................. | 180/65.1 |
| 2009/0067205 A1* | 3/2009 | Oyobe et al. ................. | 363/98 |
| 2013/0030633 A1* | 1/2013 | Yamamoto et al. ........... | 701/22 |

FOREIGN PATENT DOCUMENTS

| | | |
|---|---|---|
| JP | 2010-283932 A | 12/2010 |
| JP | 2011-015603 A | 1/2011 |

* cited by examiner

*Primary Examiner* — Adam Alharbi
(74) *Attorney, Agent, or Firm* — Dinsmore & Shohl LLP (57) ABSTRACT

A hybrid vehicle provided with a battery 10, a boost converter 20, a first inverter 30, a second inverter 40, a first motor generator (MG) 50 connected to the first inverter 30, a second MG 60 connected to the second inverter 40, an engine 70 capable of driving the first MG 50, and a controller 90 which starts and stops the boost converter 20. When electric power transmitted between the battery 10 and the boost converter 20 is equal to or below a predetermined threshold, the boost converter 20 is stopped. When an actual boost voltage of the boost converter 20 reaches a predetermined threshold, the first MG 50 is driven by the engine 70. In this way, the system efficiency of a hybrid vehicle can be advantageously improved by efficiently maintaining the boost converter at a halt for a sufficiently long period.

6 Claims, 9 Drawing Sheets

HYBRID VEHICLE HAVING BOOST CONVERTER AND CONTROL METHOD OF A HYBRID VEHICLE HAVING A BOOST CONVERTER

PRIORITY INFORMATION

This application claims priority to Japanese Patent Application No. 2014-012828 filed on Jan. 27, 2014, which is incorporated herein by reference in its entirety.

BACKGROUND

1. Technical Field

The present invention relates to a configuration of a hybrid vehicle mounted with an engine, an electric motor, and a power generator.

2. Related Art

Recently, hybrid vehicles mounted with an engine, an electric motor, and a power generator are widely used in various methods, including where a hybrid vehicle is driven by the combination of an engine output and an electric motor output depending on running conditions; and where while charging a battery by driving an electric motor with some of the engine output, a vehicle is driven by the combination of the remaining engine output and the electric motor output; and further where by driving a power generator with engine output, the generated power is used to drive an electric motor to drive a vehicle. In many cases of such a hybrid vehicle, DC low voltage of a battery is boosted to DC high voltage by a boost converter, and the boosted voltage is supplied to an electric motor or a power generator and further to each of inverters which transfer electric power to or from the electric motor or the power generator, and the electric motor is driven by converting the DC power to three-phase AC power used to drive the electric motor by each inverter, or the three-phase AC power generated by the power generator is converted to DC power.

The boost converter is used to turn ON or OFF a switching device and to boost DC low voltage of a battery by using stored energy in a reactor to output DC high voltage. Accordingly, a boost loss occurs from the ON and OFF operation of the switching device. The boost loss increases along with the increase in output electric power and boost ratio (ratio of the DC high voltage to the DC low voltage) of the boost converter, while the boost loss decreases along with the decrease of the output voltage and the boost ratio. Even when the output power of the boost converter is zero, indicating a no load state, the boost loss (switching loss) does not decrease down to zero as long as the switching device continues to be turned ON and OFF.

Ina hybrid vehicle, when the vehicle is running, for example, with the electric power generated by the power generator being balanced with the electric power consumed by the electric motor, because the electric motor can be driven by the electric power generated by the power generator without supplying the DC high voltage obtained by boosting the DC low voltage of a battery, the vehicle can continue running while maintaining the DC high voltage of the inverter at the current state. In this case, as the boost converter has no load, it may appear to be possible to improve the system efficiency of the hybrid vehicle by stopping the operation of the boost converter to reduce the boost loss (switching loss). However, because it is unlikely that the electric power consumed by the electric motor and the electric power generated by the power generator are completely balanced, if the boost converter is stopped when, for example, the electric power consumed by the electric motor is slightly larger than the electric power generated by the power generator, the DC high voltage of the inverter will gradually decrease. Therefore, methods are proposed to maintain the DC high voltage of the inverter at a target voltage by stopping the operation of the boost converter and by correcting the output torque of the electric motor so as to maintain the output power of the power generator at a constant level to minimize the deviation of the DC high voltage of the inverter from the target voltage when the electric power generated by the power generator and the electric power consumed by the electric motor are substantially balanced (refer to, for example, JP 2011-15603 A).

SUMMARY

In the conventional art described in JP 2011-15603 A, because the output electric power of a power generator cannot be changed, when the electric power output to the power generator is increased in response to a request while the boost converter is at a halt, it is impossible to compensate the increased electric power output to the power generator. Accordingly, the DC high voltage of the inverter decreases. Because it is impossible to maintain the predetermined DC high voltage, it is required to immediately restart the boost converter in response to a receipt of the request to increase the electric power output to the power generator. In other words, in the conventional art described in JP 2011-15603 A, because it is impossible to meet both of the requests to increase the electric power output to the power generator and to stop the boost converter at the same time, the time to maintain the boost converter at a halt becomes shorter. Therefore, there has been a problem that the system efficiency of hybrid vehicles cannot be sufficiently improved.

The present invention has an object to advantageously improve the system efficiency of a hybrid vehicle by maintaining a boost converter at a halt for a sufficiently long period.

A hybrid vehicle according to the present invention is characterized by including a battery; a boost converter connected to the battery; a first inverter connected to the boost converter; a second inverter connected to the boost converter and the first inverter; a power generator connected to the first inverter; an electric motor connected to the second inverter; an engine capable of driving the power generator; and a controller which starts and stops the boost converter, wherein the controller includes a boost converter stop unit which stops the boost converter when electric power transferred between the battery and the boost converter is equal to or below a predetermined threshold, and drives the power generator by the engine when an actual boost voltage of the boost converter reaches a predetermined threshold.

In a hybrid vehicle according to the present invention, it is preferable that the controller includes an engine output adjustment unit which changes an engine output in accordance with a deviation of the actual boost voltage of the boost converter from a target boost voltage.

In a hybrid vehicle according to the present invention, it is preferable that the controller includes a boost converter restart unit which restarts the boost converter when the actual boost voltage does not increase even by increasing the engine output.

A hybrid vehicle according to the present invention is characterized by including a battery; a boost converter connected to the battery; a first inverter connected to the boost converter; a second inverter connected to the boost converter and the first inverter; a power generator connected to the first inverter; an electric motor connected to the second inverter;

an engine capable of driving the power generator; and a controller which includes a CPU and starts and stops the boost converter, wherein the controller executes, using the CPU, a boost converter stop program which stops the boost converter when electric power transferred between the battery and the boost converter is equal to or below a predetermined threshold, and drives the power generator by the engine when an actual boost voltage of the boost converter reaches a predetermined threshold.

A control method of a hybrid vehicle according to the present invention is characterized in that the hybrid vehicle includes a battery; a boost converter connected to the battery; a first inverter connected to the boost converter; a second inverter connected to the boost converter and the first inverter; a power generator connected to the first inverter; and an electric motor connected to the second inverter; an engine capable of driving the power generator, wherein the boost converter is stopped when electric power transferred between the battery and the boost converter is equal to or below a predetermined threshold, and the power generator is driven by the engine when an actual boost voltage of the boost converter reaches a predetermined threshold.

The present invention has an advantage that the system efficiency of a hybrid vehicle can be efficiently improved by maintaining a boost converter at a halt for a sufficiently long period.

DETAILED DESCRIPTION

Figure 1:
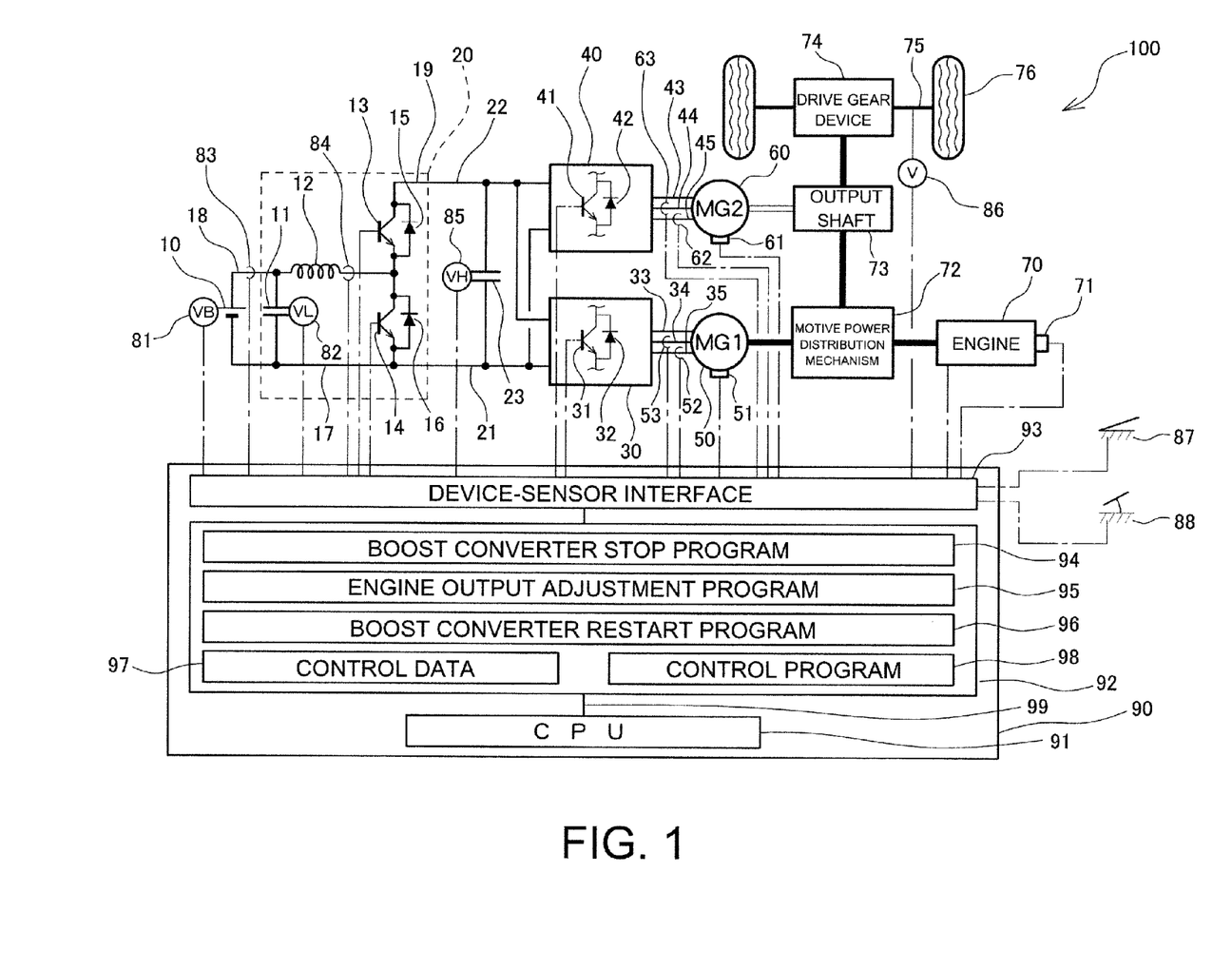
FIG. 1 is a system diagram showing a configuration of a hybrid vehicle according to an embodiment of the present invention.

Embodiments of the present invention are described below with reference to the attached drawings. As shown in FIG. 1, a hybrid vehicle 100 according an embodiment of the present invention is provided with a battery 10 which is a rechargeable and dischargeable secondary battery, a boost converter 20 connected to the battery 10, a first inverter 30 connected to the boost converter 20, a second inverter 40 connected to the boost converter 20 and the first inverter 30, a first motor generator 50 which is a power generator connected to the first inverter 30, a second motor generator 60 which is a power generator connected to the second inverter 40, an engine 70 capable of driving the first motor generator 50, and a controller 90 which controls the engine 70, the boost converter 20, and the first and the second inverters 30, 40.

As shown in FIG. 1, the hybrid vehicle 100 is further provided with a motive power distribution mechanism 72 which distributes the output torque of the engine 70 between an output shaft 73 connected to the second motor generator 60 and the first motor generator 50, a drive gear device 74 connected to the output shaft 73, an axle 75 connected to the drive gear device 74, and wheels 76 connected to the axle 75. The first and second motor generators 50, 60 and the engine 70 are respectively provided with resolvers 51, 61, 71, each of which senses a rotation angle or rotation speed of a rotor or crankshaft. Further, the axle 75 is provided with a vehicle speed sensor 86 which senses the vehicle speed of the hybrid vehicle 100 by sensing the number of rotations of the axle.

The boost converter 20 is provided with a negative-side electrical path 17 connected to the negative side of the battery 10, a low-voltage electrical path 18 connected to the positive side of the battery 10, and a high-voltage electrical path 19 at a positive-side output end of the boost converter 20. The boost converter 20 is provided with an upper arm switching device 13 positioned between the low-voltage electrical path 18 and the high-voltage electrical path 19, a lower arm switching device 14 positioned between the negative-side electrical path 17 and the low-voltage electrical path 18, a reactor 12 positioned in series in the low-voltage electrical path 18, and a reactor current sensor 84 which senses reactor current IL flowing through the reactor 12, a filter capacitor 11 positioned between the low-voltage electrical path 18 and the negative-side electrical path 17, and a low voltage sensor 82 which senses DC low voltage VL at both ends of the filter capacitor 11. Further, the switching devices 13, 14 are respectively provided with diodes 15, 16 which are connected in anti-parallel. The boost converter 20 stores electrical energy from the battery 10 in the reactor 12 by turning ON the lower arm switching device 14 and turning OFF the upper arm switching device 13. Then, the boost converter 20 boosts the voltage by using the stored electrical energy in the reactor 12 by turning OFF the lower arm switching device 14 and turning ON the upper arm switching device 13 to supply boosted DC high voltage VH to the high-voltage electrical path 19.

The battery 10 is mounted with a battery voltage sensor 81 which senses a battery voltage VB. A battery current sensor 83 is also attached to the low-voltage electrical path 18 between the battery 10 and the boost converter 20 for sensing a battery current IB flowing between the battery 10 and the boost converter 20.

The first inverter 30 and the second inverter 40 are provided with a common high-voltage electrical path 22 connected to the high-voltage electrical path 19 of the boost converter 20 and a common negative-side electrical path 21 connected to the negative-side electrical path 17 of the boost converter 20. A smoothing capacitor 23 which smoothens the DC current supplied from the boost converter 20 is connected between the high-voltage electrical path 22 and the negative-side electrical path 21. The DC high-voltage VH which is boost voltage supplied to the inverters 30, 40 is sensed by a high-voltage sensor 85 which senses voltage at both ends of the smoothing capacitor 23. Therefore, the DC high-voltage VH sensed by the high-voltage sensor 85 is an actual boost voltage (actual boost voltage VHr). Accordingly, in the present embodiment, the actual boost voltage VHr supplied to each of the first and the second inverters 30, 40 is the same voltage. The first inverter 30 converts DC power supplied from the boost converter 20 to the first three-phase AC power, and supplies the first three-phase AC power to the first motor generator 50. The first inverter 30 further converts the first three-phase AC power generated by the first motor generator 50 to DC power, and charges the DC power to the battery 10 via the boost converter 20, or supplies the converted DC power to the second inverter 40. The second inverter 40 converts the DC power supplied from the boost converter 20 to the second three-phase AC power, and supplies the second three-phase AC power to the second motor generator 60. The second inverter 40 further converts the second three-phase AC power generated by the second motor generator 60 to DC power, and charges the DC power to the battery 10 via the boost converter 20, or supplies the converted DC power to the first inverter 30.

The first inverter 30 internally includes two switching devices, each at an upper arm and a lower arm of each of U, V, W phases, and thus six switching devices 31 are provided in total. Each switching device 31 includes a diode 32 connected in anti-parallel (in FIG. 1, one of the six switching devices and one of the diodes are shown, while the other switching devices and the diodes are omitted). Output lines 33, 34, 35 which output electric current in respective phases (U, V, or W) are connected between the upper arm switching device and the lower arm switching device of each of the U, V, and W phases of the first inverter 30. Each of the output lines 33, 34, 35 is connected to an input terminal of each of the U, V, and W phases of the first motor generator 50. Further, in the present embodiment, the V-phase and W-phase output lines 34, 35 respectively include current sensors 53, 52, which respectively sense the electric current of the V-phase and W-phase output lines 34, 35. It should be noted that although no current sensor is attached to the U-phase output line 33, the U-phase current value can be obtained based on the V-phase and W-phase current values because, in three-phase AC current, the sum of the U-phase, V-phase, and W-phase electric current is zero.

The configurations of the second inverter 40 (including switching device 41, diode 42, and output lines 43, 44, 45) and the electric sensors 62, 63 are respectively identical to those of the first inverter 30 and the current sensors 52, 53. The hybrid vehicle 100 is further provided with an accelerator pedal depression amount sensor 87 and a brake pedal depression amount sensor 88 which respectively sense a depression amount of an accelerator pedal and a brake pedal.

As shown in FIG. 1, the controller 90 is a computer including a CPU 91 which performs operations and information processing, a storage unit 92, and a device-sensor interface 93, all of which are connected via a data bus 99. The storage unit 92 stores control data 97, a control program 98, a boost converter stop program 94 (described further below, and also referred to as "boost converter stop unit"), an engine output adjustment program 95 (also referred to as "engine output adjustment unit"), and a boost converter restart program 96 (also referred to as "boost converter restart unit"). The above described switching devices 13, 14 of the boost converter 20 and the switching devices 31, 41 of the first and the second inverters 30, 40 are connected to the controller 90 via the device-sensor interface 93 and configured to be operated in response to commands from the controller 90. Further, outputs from each sensor (the battery voltage sensor 81, the low voltage sensor 82, the high-voltage sensor 85, the battery current sensor 83, the reactor current sensor 84, the current sensors 52, 53, 62, 63, the resolvers 51, 61, 71, the vehicle speed sensor 86, the accelerator pedal depression amount sensor 87, and the brake pedal depression amount sensor 88) are supplied to the controller 90 via the device-sensor interface 93.

Figure 2:
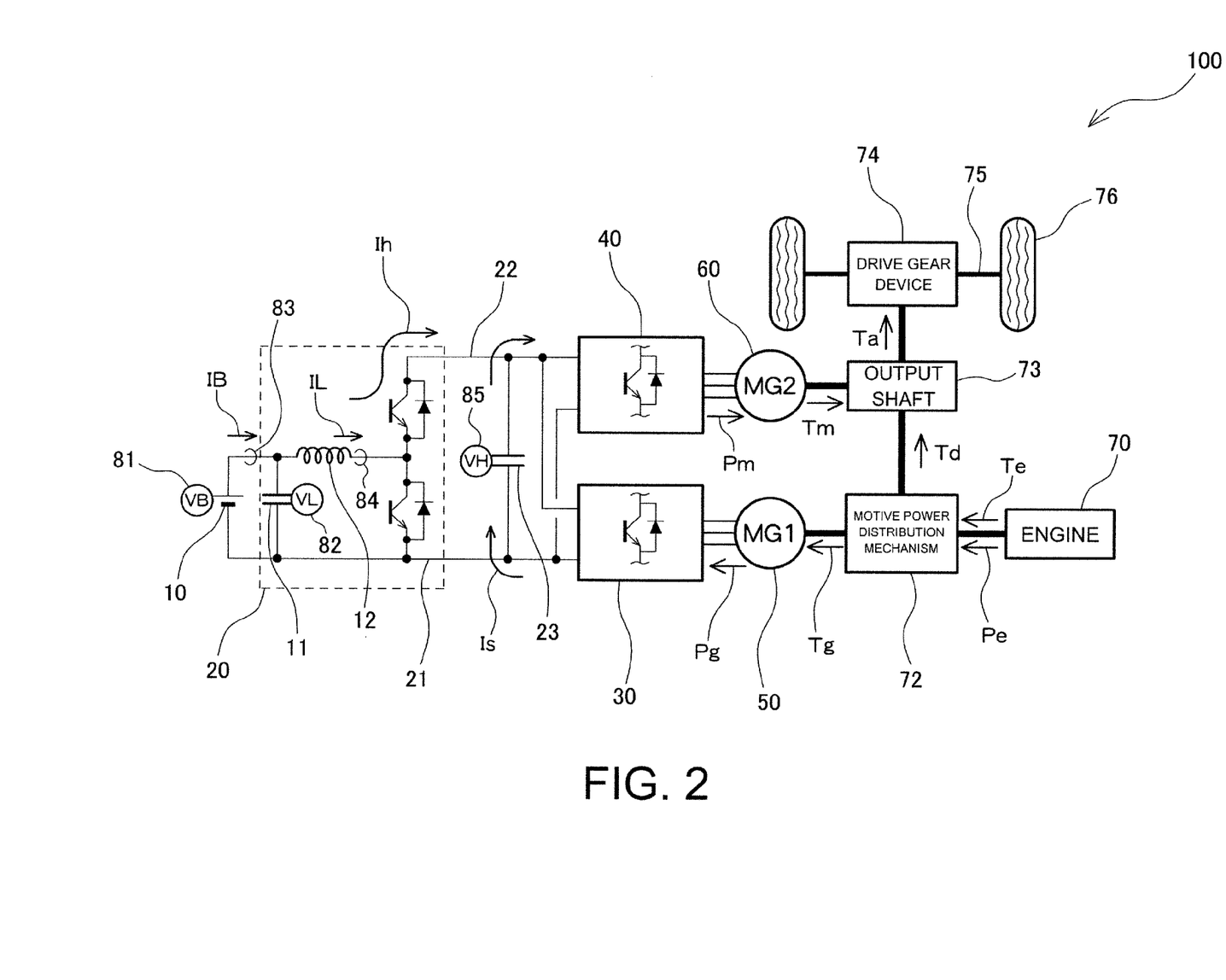
FIG. 2 is an illustrative diagram showing flows of motive power, electric power, and electric current of a hybrid vehicle according to an embodiment of the present invention.

Basic operations of the hybrid vehicle 100 are briefly described below with reference to FIG. 2 before describing operations of the hybrid vehicle 100 configured as described above when the boost converter is at a halt. Although the hybrid vehicle 100 is provided with various drive modes, a drive mode in which the hybrid vehicle 100 is driven by outputs from the engine 70 and the second motor generator 60 is described below.

The engine 70 outputs an engine output Pe and an engine torque Te. The engine torque Te is distributed by the motive power distribution mechanism 72 to a first torque Tg which is used to drive the first motor generator 50 and a directly-to-engine torque Td which is used to drive the wheels 76 via the output shaft 73 and the drive gear device 74. As the motive power distribution mechanism 72, a planetary gear system or the like may be used. Serving as a power generator, the first motor generator 50 is driven by the first torque Tg from the motive power distribution mechanism 72 and outputs generated power Pg which is three-phase AC power to the first inverter 30. The first inverter 30 converts the supplied AC generated power Pg to DC power as DC high power and outputs the converted power to the high-voltage electrical path 22 and the negative-side electrical path 21. The output DC current Is is supplied to the second inverter 40 via the smoothing capacitor 23.

The battery current IB of battery voltage VB supplied from the battery 10 is charged into a filter capacitor 11 of the boost converter 20 such that the voltage at both ends of the filter capacitor 11 becomes DC low voltage VL. Therefore, when the battery 10 and the boost converter 20 are connected with the filter capacitor 11 which has been charged, the battery voltage VB becomes equal to the DC low voltage VL. As described above, the boost converter 20 stores electric energy from the battery 10 in the reactor 12 by turning the lower arm switching device 14 ON and the upper arm switching device 13 OFF. Then, the boost converter 20 boosts the voltage with the electric energy stored in the reactor 12 by turning the lower arm switching device 14 OFF and the upper arm switching device 13 ON, and outputs boosted DC high voltage VH to the high-voltage electrical path 19. At this time, the electric power of (battery voltage VB×battery current IB) or (DC low voltage VL×reactor current IL) is supplied to the boost converter 20 from the battery 10. The boost converter 20 outputs this supplied electric power as electric power of (DC high voltage VH×average current Ih). The controller 90 controls the ON/OFF duty of each of the switching devices 13, 14 to adjust the DC high voltage VH to be the target boost voltage $VH_1$.

The DC current Ih of the DC high voltage VH output from the boost converter 20 is merged with the DC current Is of the DC high voltage VH output from the first inverter 30 and then supplied to the second inverter 40. The second inverter 40 converts the DC power of the supplied DC high voltage VH and the DC current (Is+Ih) to three-phase AC power supply Pm, and supplies the converted power to the second motor generator 60 which serves as a motor. The second motor generator 60 is driven by the power supply Pm and supplies motor torque Tm to the output shaft 73. The above described directly-to-engine torque Td and the motor torque Tm are supplied to the output shaft 73. The total torque Ta of the directly-to-engine torque Td and the motor torque Tm are transmitted to the drive gear device 74. The wheels 76 are driven by the total torque Ta of the directly-to-engine torque Td and the motor torque Tm, respectively output from the engine 70 and the second motor generator 60. It should be noted that in the description below, it is assumed that the electric power towards each of the motor generators 50, 60 is positive, while the electric power from each of the motor generators 50, 60 to each of the inverters 30, 40 is negative. Therefore, the generated power Pg of the first motor generator 50 is negative and the power supply Pm supplied to the second motor generator 60 is positive.

When the motive power required for the hybrid vehicle 100 is low, the DC power of the DC high voltage VH and the DC current Is output from the first inverter 30 are not supplied to the second inverter 40 but stepped-down by the boost converter 20 and charged to the battery 10. Further, during braking the hybrid vehicle 100, the second motor generator 60 also serves as a power generator, and the generated AC power (negative) is converted by the second inverter 40 to DC power and charged to the battery 10.

Next, with reference to FIGS. 3 to 7, operations of a hybrid vehicle 100 according to the present invention are described below, including operations to stop the boost converter 20, adjusting operations of the engine output Pe with the boost converter 20 at a halt when the absolute value of the power supply Pm (positive) supplied to the second motor generator 60 is larger than the absolute value of the generated power Pg (negative) generated by the first motor generator 50, and restarting operations of the boost converter 20. It should be noted that $OP_1$ to $OP_3$ and $OP_5$ in FIGS. 4C and 4E respectively correspond to the operation points $OP_1$ to $OP_3$, and $OP_5$ of the engine 70 shown in FIGS. 5 and 6.

Figure 4A:
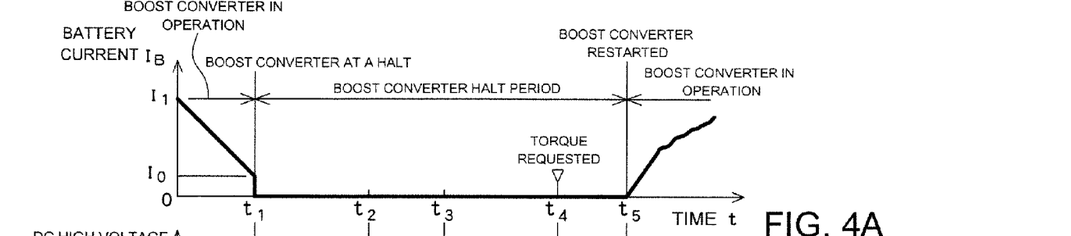
FIG. 4A is a graph showing changes in electric current of a battery over time during the operation shown in FIG. 3.
Figure 4B:
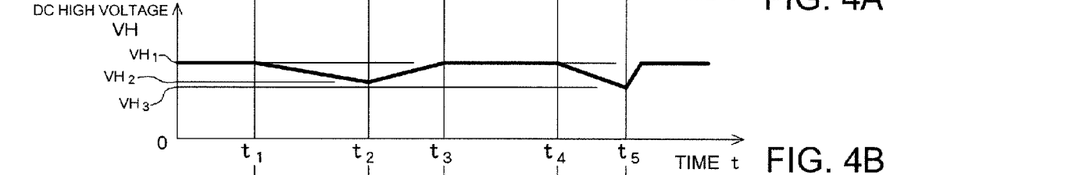
FIG. 4B is a graph showing changes in DC high voltage over time during the operation shown in FIG. 3.
Figures 4C, 4D:
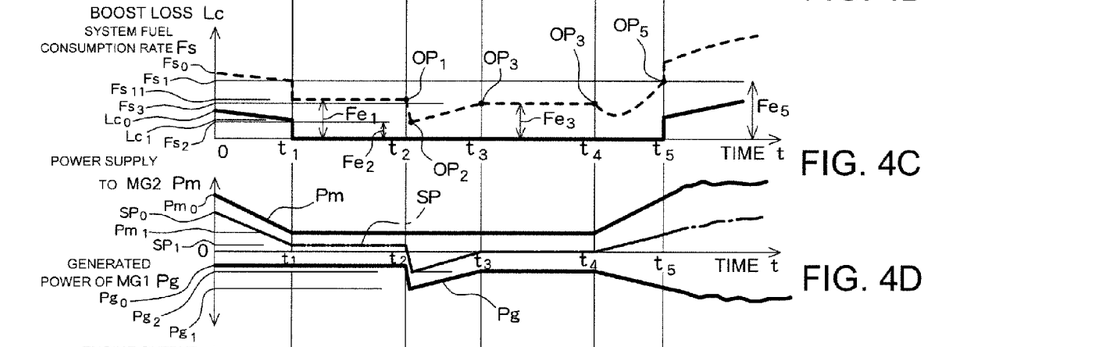
FIG. 4C is a graph showing changes in a boost loss and a system fuel consumption rate over time during the operation shown in FIG. 3.
FIG. 4D is a graph showing changes in electric power supply to a second motor generator and generated power of a first motor generator over time during the operation shown in FIG. 3.

At time zero (initial state) shown in FIGS. 4A to 4E, the boost converter 20 is in operation, and the actual boost voltage VHr which is the DC high voltage VH sensed by the high-voltage sensor 85 is equal to the target boost voltage $VH_1$. The engine 70 is operated at an operation point OP' with the engine output Pe=$Pe_1$ (refer to FIG. 5). As shown in FIG. 4D, the first motor generator 50 is driven as a power generator by the engine 70. The generated power Pg is $Pg_0$ (negative). As described above with reference to FIG. 2, the generated power $Pg_0$ is converted by the first inverter 30 to DC power of the target boost voltage $VH_1$ and the DC current Is ($VH_1 \times Is$) and supplied to the second inverter 40. Further, at time zero (initial state), the battery current IB output from the battery 10 is $I_1$. Because the voltage of the battery 10 is the battery voltage VB, the DC power of (battery voltage $VB \times I_1$) is supplied from the battery 10 to the boost converter 20. The total DC power of the DC power from the first inverter 30 ($VH_1 \times Is$) and the DC power from the battery 10 (battery voltage $VB \times I_1$) is supplied to the second inverter 40, which converts the total DC power to the power supply Pm (positive) supplied to the second motor generator 60 and outputs the converted power. In other words, in order to compensate the difference between the absolute value of the power supply Pm (positive) supplied to the second motor generator 60 and the absolute value of the generated power Pg (negative) of the first motor generator 50, the DC power of (battery voltage $VB \times I_1$) is supplied from the battery 10 to the boost converter 20. Accordingly, the total power SP of the generated power Pg (negative) of the first motor generator 50 and the power supply Pm (positive) supplied to the second motor generator 60 is $Pg_0$ (negative)+$Pm_0$ (positive)=$SP_0$ (positive). As shown in FIG. 4D, because the absolute value of $Pm_0$>the absolute value of $Pg_0$ at time zero, $SP_0$ is positive.

Figure 6:
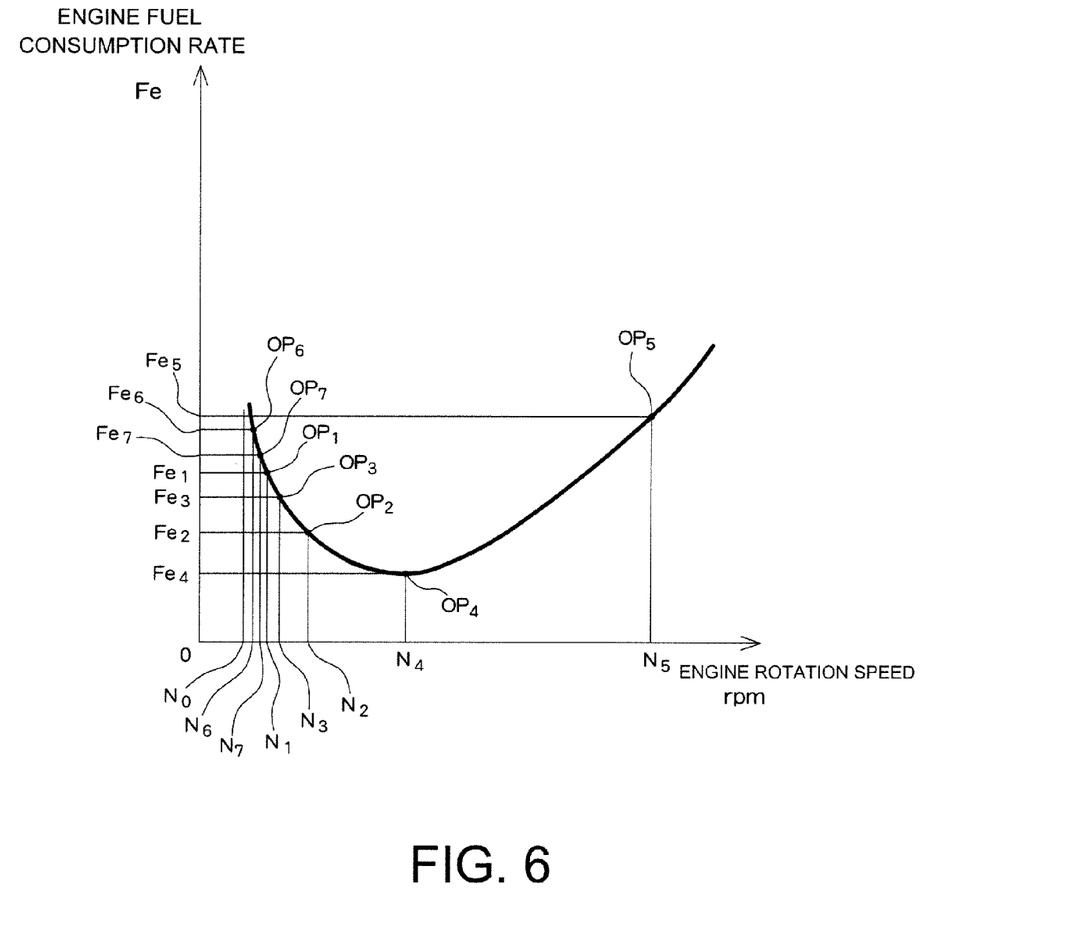
FIG. 6 is a graph showing changes in an engine fuel consumption rate at the operation points of the engine shown in FIG. 5.

Further, as shown by the solid line in FIG. 4C, the boost loss (switching loss) Lc of the boost converter 20 at time zero is $Lc_0$. Because the engine 70 is operated at an operation point $OP_1$, the engine fuel consumption rate Fe is $Fe_1$ as shown in FIG. 6. In the present embodiment, the system fuel consumption rate Fs (reciprocal of the system efficiency) of the hybrid vehicle 100 is defined as the sum of the engine fuel consumption rate Fe shown in FIG. 6 and a boost fuel consumption rate Fc which is obtained by converting the boost loss Lc shown in FIG. 7 to the system fuel consumption rate. Accordingly, the following equation can be defined:

System fuel consumption rate Fs=Engine fuel consumption rate Fe+Boost fuel consumption rate Fc Therefore, as shown by the broken line in FIG. 4C, the system fuel consumption rate $Fs_0$ at time zero is the sum of the engine fuel consumption rate $Fe_1$ at the operation point $OP_1$ of the engine 70 and the boost fuel consumption rate $Fc_0$ which is obtained by converting the boost loss $Lc_0$ to the fuel consumption rate ($Fs_0=Fe_1+Fc_0$).

The controller 90 performs the boost converter stop program 94 (boost converter stop unit) shown in FIG. 1. First, as shown in step S101 in FIG. 3, the controller 90 obtains the battery current IB by the battery current sensor 83. As described above, at time zero shown in FIGS. 4A to 4E, in order to compensate the difference between the absolute value of the power supply Pm (positive) supplied to the second motor generator 60 and the absolute value of the generated power Pg (negative) generated by the first motor generator 50, the DC power of (battery voltage $VB \times I_1$) is supplied from the battery 10 to the boost converter 20.

Figure 3:
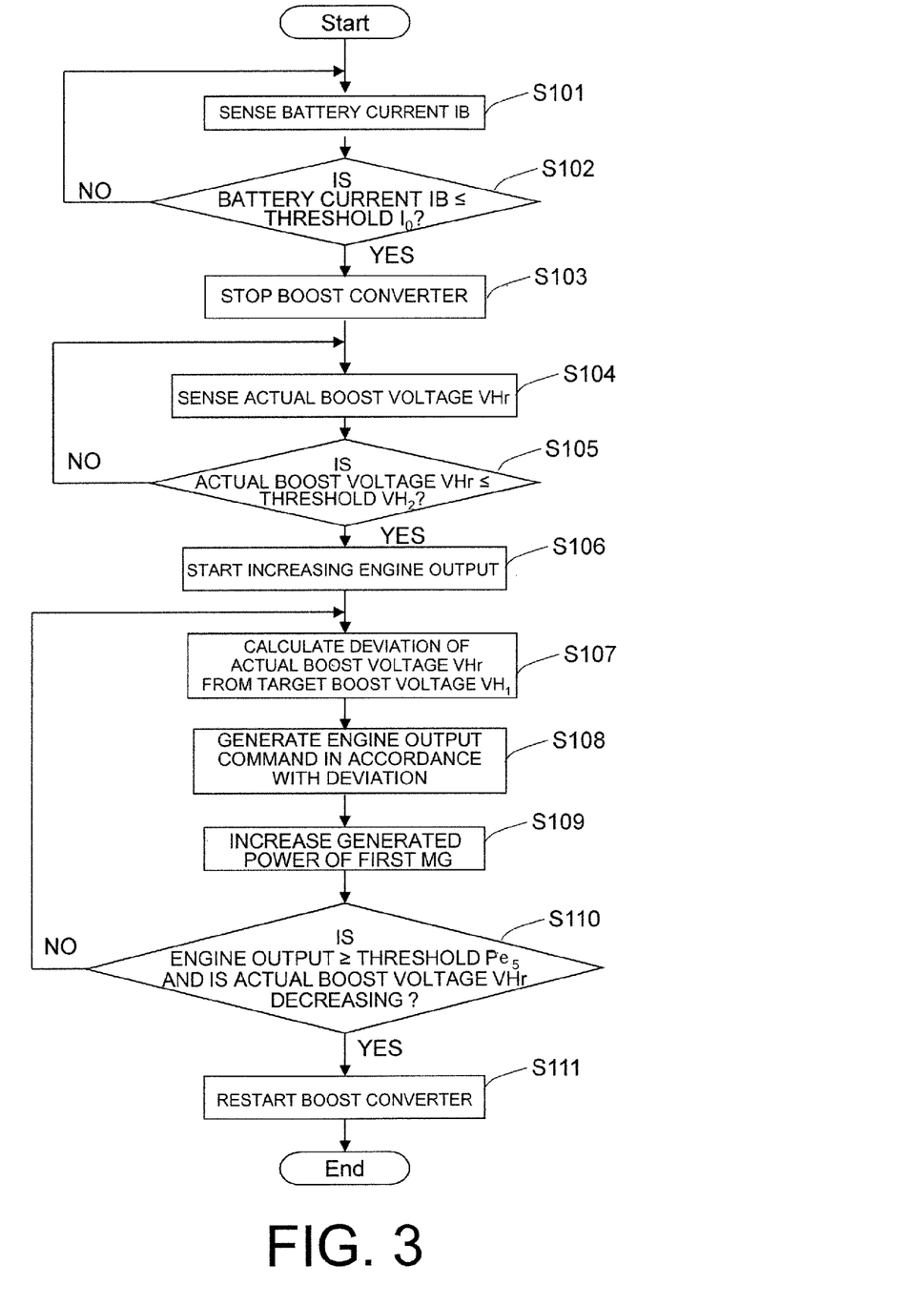
FIG. 3 is a flowchart showing operations of a hybrid vehicle according to an embodiment of the present invention.

As shown in step S102 in FIG. 3, the controller 90 compares the battery current IB sensed by the battery current sensor 83 and a threshold $I_0$. The threshold $I_0$ is such a current value that because the battery current IB is very low, the DC power output from the boost converter 20 (battery voltage $VB \times I_0$) can be assumed to be about zero. As shown in step S102 in FIG. 3, when the battery current IB is not less than or equal to the threshold $I_0$, the controller 90 returns to step S101 in FIG. 3 to continue monitoring of the battery IB.

Figure 4E:
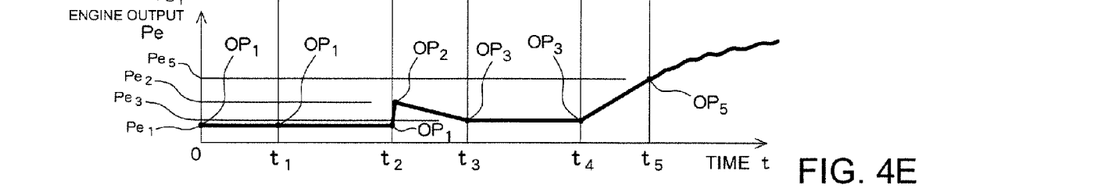
FIG. 4E is a graph showing changes in an engine output over time during the operation shown in FIG. 3.
Figure 7:
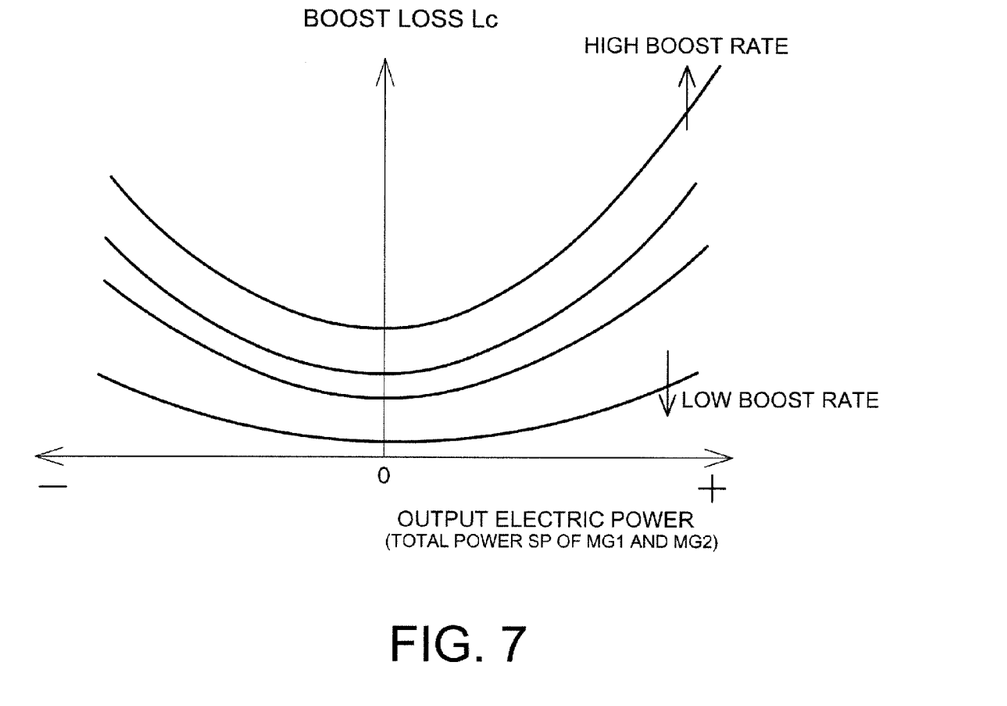
FIG. 7 is graph showing loss characteristics of a boost converter mounted on a hybrid vehicle according to an embodiment of the present invention.

When the output torque command of the second motor generator 60 is low as shown in a period from time zero to time $T_1$ in FIG. 4D, the power supply Pm supplied to the second motor generator 60 gradually decreases from $Pm_0$ at time zero. Along with this decrease, the battery current IB also gradually decreases from $I_1$ at time zero. Because the engine 70 is operated at the operation point $OP_1$ shown in FIG. 5 during this period, the engine output Pe is constant at $Pe_1$ and the generated power of the first motor generator 50 driven by the engine 70 is also constant at $Pg_0$ as shown in FIGS. 4D, 4E. Therefore, the total power SP of the generated power Pg (negative) of the first motor generator 50 and the power supply Pm (positive) supplied to the second motor generator 60 also gradually decreases from $SP_0$ at time zero. When the total power SP of the generated power Pg (negative) of the first motor generator 50 and the power supply Pm (positive) supplied to the second motor generator 60 decreases down to near zero, the boost loss Lc of the boost converter 20 also decreases as shown in FIG. 7. Accordingly, as shown by the solid line in FIG. 4C, the boost loss Lc decreases from $Lc_0$ to $Lc_1$ during a period from time zero to time $t_1$. In this way, the system fuel consumption rate Fs also gradually decreases from ($Fs_0=Fe_1+Fc_0$) at time zero to ($Fs_1=Fe_1+Fc_1$). It should be noted here that the $Fc_1$ indicates a boost fuel consumption rate which is obtained by converting the boost loss $Lc_1$ to the fuel consumption rate.

When the power supply Pm supplied to the second motor generator 60 decreases down to Pm' at time $t_1$ as shown in FIG. 4D, the battery current IB decreases down to zero as shown in FIG. 4A. Then, the controller 90 determines in step S102 in FIG. 3 that the battery current IB is less than or equal to the threshold $I_0$, and issues a command to stop the boost converter 20 as shown in step S103 in FIG. 3. In response to this command, the upper arm switching device 13 and the lower arm switching device 14 of the boost converter 20 are turned OFF to disconnect the connection between the boost converter 20 and each of the first and the second inverters 30, 40, and the boost converter stop program 94 (boost converter stop unit) is exited.

Because the connection between the boost converter 20 and each of the first and the second inverters is disconnected when the boost converter 20 is stopped at time $t_1$ in FIG. 4A, no electric current flows from the battery 10 to the second inverter 40. Accordingly, the battery current IB decreases down to zero and the DC current supplied from the battery 10 to the second inverter 40 also decreases down to zero. The power supply Pm supplied to the second motor generator 60 is the total power of the generated power Pg of the first motor generator 50 and the discharged power Pc of the smoothing capacitor 23. Further, because the switching devices 13, 14 of the boost converter 20 are maintained to be OFF, the boost loss Lc caused by switching decreases from $Lc_1$ to zero as shown by the solid line in FIG. 4C. Accordingly, as shown by the broken line in FIG. 4C, the system fuel consumption rate Fs is reduced from the $Fs_1$ ($Fs_1=Fe_1+Fc_1$) to $Fs_{11}$ which is lowered for the amount of the boost fuel consumption rate $Fc_1$ obtained by converting the boost loss $Lc_1$ ($Fs_{11}=Fs_1-Fc_1$). Accordingly, because the system fuel consumption rate Fs is reduced for the amount of the boost fuel consumption rate $Fc_1$, the system efficiency is improved. Because the system fuel consumption rate Fs becomes equal to the engine fuel consumption rate Fe when the boost converter 20 is stopped as shown in FIG. 4C, the equation is defined as $Fs_{11}=Fe_1$. Even when the boost converter 20 is stopped at time $t_1$, the actual boost voltage VHr which is the voltage at both ends of the smoothing capacitor 23 sensed by the high-voltage sensor 85 is maintained at the target boost voltage $VH_1$, which is the boost voltage before the boost converter 20 is stopped, by using electric charge stored in the smoothing capacitor 23.

Because the engine 70 continues to operate at the operation point $OP_1$ at which the engine output Pe is maintained at $Pe_1$ as shown in FIG. 4E even when the boost converter 20 is stopped at time $T_1$, the generated power Pg of the first motor generator 50 is maintained at $Pg_0$, which is the same as at time zero. Further, as shown in FIG. 4D, the output torque of the second motor generator 60 is substantially constant, and the power supply Pm (positive) supplied to the second motor generator 60 is maintained at $Pm_1$, which is the same as at time $t_1$ when the boost converter 20 was stopped. It should be noted here that because the absolute value of the power supply $Pm_1$ supplied to the second motor generator 60 at time $t_1$ is larger than the absolute value of the generated power $Pg_0$ (negative) of the first motor generator 50, the total power SP of both power is $SP_1(=Pm_1+Pg_0)$ which is slightly in positive.

As described above, because, when the boost converter 20 is at a halt, the absolute value of the power supply Pm' supplied to the second motor generator 60 is larger than the absolute value of the generated power $Pg_0$ (negative) of the first motor generator 50, the smoothing capacitor 23 discharges the discharge power Pc to compensate the amount of the total power $SP_1$. Accordingly, as shown in FIG. 4B, the actual boost voltage VHr gradually decreases from the target boost voltage $VH_1$ after time $T_1$.

After exiting the boost converter stop program 94 shown in FIG. 1, the controller 90 starts executing the engine output adjustment program 95 (engine output adjustment unit) shown in FIG. 1 at time $t_1$ shown in FIG. 4E. The controller 90 senses the actual boost voltage VHr at both ends of the smoothing capacitor 23 using the high-voltage sensor 85, as shown in step S104 in FIG. 3. Then, the controller 90 determines whether or not the actual boost voltage VHr is less than or equal to the first threshold voltage $VH_2$, as shown in step S105 in FIG. 3. When the actual boost voltage VHr is not less than or equal to the first threshold voltage $VH_2$, the controller 90 returns to step S104 in FIG. 3 to continue monitoring of the actual boost voltage VHr. As shown in FIG. 4B, when the actual boost voltage VHr is equal to or below the first threshold voltage $VH_2$ at time $T_2$, the controller 90 outputs a command to increase the engine output Pe, as shown in step S106 in FIG. 3.

As shown in step S107 in FIG. 3, the controller 90 calculates a deviation of the actual boost voltage VHr sensed by the high-voltage sensor 85 from the target boost voltage $VH_1$. Because the actual boost voltage VHr sensed by the high-voltage sensor 85 is equal to the first threshold voltage $VH_2$ at time $t_2$, the deviation is obtained by ($VH_1-VH_2$). As shown in step S108 in FIG. 3, the controller 90 calculates a suitable increase of the engine output Pe in accordance with the obtained deviation ($VH_1-VH_2$) and generates an output command to the engine. For example, the increase of the engine output Pe may be set at a value in proportion to the deviation ($VH_1-VH_2$). Then, as shown in step S109 in FIG. 3, the controller 90 increases both of the engine output Pe and the generated power Pg of the first motor generator 50.

Figure 5:
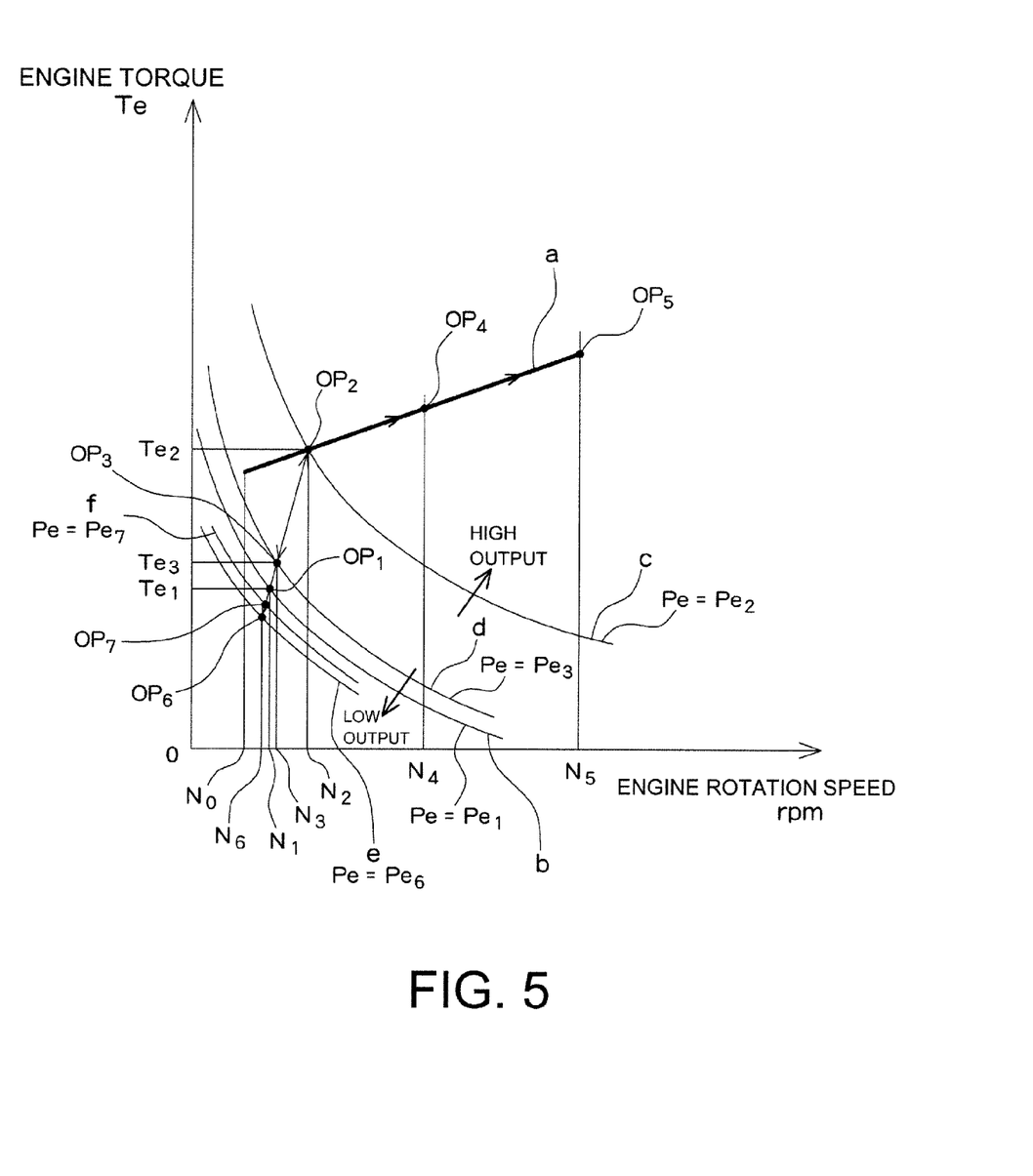
FIG. 5 is a graph showing changes in operation points of an engine of a hybrid vehicle according to an embodiment of the present invention.

With reference to FIGS. 5 and 6, relationships among the rotation speed, engine torque Te, engine output Pe (kW), and engine fuel consumption rate Fe of the engine 70 are described below. The lines b, c, d, e, and f in FIG. 5 are curves showing relationships between the rotation speed and engine torque Te of the engine 70 when the engine output Pe is maintained at a constant level at $Pe_1$, $Pe_2$, $Pe_3$, $Pe_6$, or $Pe_7$ ($Pe_6<Pe_7<Pe_1<Pe_3<Pe_2$). As shown in FIG. 5, the curves b to f depart farther from the origin along with the increase of the engine output Pe. Further, the line a in FIG. 5 shows an optimal control curve in which the fuel consumption rate of the engine 70 (fuel consumption rate with the vehicle in the hybrid running mode) is minimum. In a normal operation, the rotation speed and the engine torque Te of the engine 70 are controlled along the line a. The rotation speed $N_0$ in FIG. 5 is the idling rotation speed of the engine 70. In a normal operation, the engine 70 is operated at a rotation speed equal to or over this rotation speed No. In FIG. 5, $OP_1$ to $OP_7$ are operation points of the engine 70. FIG. 6 shows changes in the engine fuel consumption rate Fe of the engine 70 from the operation points $OP_1$ to $OP_7$.

At time $t_2$ in FIG. 4E, the engine 70 is operated at the operation point $OP_1$ with the engine output Pe at $Pe_1$ and the engine rotation speed at $N_1$. As indicated by the wide departure from the optimal control curve a, at the operation point $OP_1$, the efficiency of the engine 70 is low and the engine consumption rate Fe is high at $Fe_1$ as shown in FIG. 6. As described above, at time $T_2$, the deviation of the actual boost voltage VHr sensed by the high-voltage sensor 85 from the target boost voltage $VH_1$ is $(VH_1-VH_2)$. The controller 90 sets the command value of the engine output Pe at $Pe_2$ based on this deviation $(VH_1-VH_2)$. Accordingly, the controller 90 increases the engine output Pe from $Pe_1$ at the operation point $OP_1$ at time$_1$ to $Pe_2$, as shown in FIG. 4E. The operation point of the engine 70 moves to the operation point $OP_2$ with the rotation speed $N_2$ and engine torque $Te_2$. As shown in FIG. 5, because the operation point $OP_2$ is on the operation control curve a, the operation point $OP_2$ is more efficient than the operation point $OP_1$ that has departed from the optimal control curve a such that, as shown in FIG. 6, the engine fuel consumption rate Fe is $Fe_2$ which is below $Fe_1$. Accordingly, because, as shown by the broken line in FIG. 4C, the system fuel consumption rate Fs decreases from $Fs_{11}$ (=$Fe_1$) at which the boost converter 20 was stopped at time $t_1$ to $Fs_2$ (=$Fe_2$), the system fuel consumption rate Fs of the hybrid vehicle 100 is reduced for the amount of $(Fs_{11}-Fs_2)$=$(Fe_1-Fe_2)$. In other words, the system fuel consumption rate Fs decreases for the amount equal to the decrease of the engine fuel consumption rate Fe caused by the increase of the output of the engine 70. The system efficiency of the hybrid vehicle 100 increases for the amount equal to this decrease. Further, because the engine output is increased to $Pe_2$, the generated power Pg of the first motor generator 50 is increased from $Pg_0$ at time $t_2$ to $Pg_2$. In this way, the smoothing capacitor 23 is charged (the discharge power Pc of the smoothing capacitor 23 becomes negative) such that the voltage at both ends of the smoothing capacitor 23 increases. Accordingly, as shown in FIG. 4B, the actual boost voltage VHr sensed by the high-voltage sensor 85 gradually increases after time $t_2$.

Because the engine output $Pe_2$ is below the threshold $Pe_5$ of the engine output Pe as shown in FIG. 4E (the threshold $Pe_5$ of the engine output Pe is described further below), in step S110 in FIG. 3, the controller 90 determines that the engine output Pe is not over the threshold Pas and the actual boost voltage VHr is not decreasing, and returns to S107 in FIG. 3 to calculate a deviation of the actual boost voltage VHr sensed by the high-voltage sensor 85 from the target boost voltage $VH_1$.

As shown in FIG. 4B, because the actual boost voltage VHr sensed by the high-voltage sensor 85 increases after time $t_2$, the deviation of the actual boost voltage VHr sensed by the high-voltage sensor 85 from the target boost voltage $VH_1$ gradually decreases in comparison to the deviation $(VH_1-VH_2)$ at time $t_2$. Accordingly, the controller 90 reflects the deviation in the increase of the engine output Pe such that the engine output Pe is controlled to be decreased from $Pe_2$ at time $T_2$ along with the decrease in the deviation.

As shown in FIGS. 4E and 4B, during a period from time $t_2$ to time $t_3$, the actual boost voltage VHr sensed by the high-voltage sensor 85 gradually increases towards the target boost voltage $VH_1$, while the engine output Pe gradually decreases. The operation point of the engine 70 moves in a direction departing from the optimal control curve a from the operation point $OP_2$ at time $t_2$ towards the operation point $OP_3$ at which the engine output Pe is at $Pe_3$. Because, in this way, the engine fuel consumption rate Fe increases from $Fe_2$ to $Fe_3$ as shown in FIG. 6, the system fuel consumption rate Fs of the hybrid vehicle 100 also increases from $Fs_2$ (=$Fe_2$) immediately after time $T_2$ for the amount equal to $(Fs_3-Fs_2)$=$(Fe_3-Fe_2)$ in addition to $Fs_3$ (=$Fe_3$) at time $t_3$. Therefore, the system fuel consumption rate Fs increases, while the system efficiency of the hybrid vehicle 100 decreases for the amount equal to this increase.

As shown in FIGS. 4B, 4D, and 4E, when the engine output Pe is at $Pe_3$ at $t_3$, the generated power of the first motor generator 50 becomes $Pg_2$ such that the absolute value of the $Pg_2$ becomes equal to the absolute value of the power supply supplied to the second motor generator 60. In other words, the generated power Pg of the first motor generator 50 and the power supply Pm supplied to the second motor generator 60 are in a balanced state. Accordingly, the discharge power Pc of the smoothing capacitor 23 becomes zero, while the actual boost voltage VHr sensed by the high-voltage sensor 85 is maintained at the target boost voltage $VH_1$ after reaching the target boost voltage $VH_1$.

When the driver steps on the accelerator pedal of the hybrid vehicle 100 at time $t_4$ in FIGS. 4A to 4E, the accelerator pedal depression amount sensed by the accelerator pedal depression amount sensor 87 increases. Therefore, the controller 90 determines that a request to increase the drive torque has been received and issues commands to increase the motor torque Tm of the second motor generator 60 and the engine torque Te of the engine 70. In response to these commands, the power supply Pm supplied to the second motor generator 60 and the engine output Pe are increased after $t_4$, as shown in FIG. 4D. When the accelerator pedal depression amount is not large, the boost converter 20 can be maintained at a halt because it is possible to maintain the generated power Pg of the first motor generator 50 and the supplied power Pm supplied to the second motor generator 60 in a balanced state by increasing the engine torque Te to increase the generated power Pg of the first motor generator 50.

In contrast, when the accelerator pedal depression amount is large, the controller 90 determines that a request to significantly increase the torque has been received and shifts to an operation mode in which some of the engine torque Te is applied to a directly-to-engine torque Td and the torque Ta supplied to the drive gear device 74 is increased. Accordingly, in the engine output Pe, the amount of output used for the power generation of the first motor generator 50 gradually decreases. Therefore, the amount of generated power Pg of the first motor generator 50 decreases below the power supply Pm supplied to the second motor generator 60. Because this shortfall is supplemented by the discharged power Pc discharged by the smoothing capacitor 23, the actual boost voltage VHr sensed by the high-voltage sensor 85 gradually decreases. In this way, the deviation of the actual boost voltage VHr sensed by the high-voltage sensor 85 from the target boost voltage $VH_1$ gradually increases, causing the engine output Pe to be increased.

When the operation point of the engine 70 moves from the operation point $OP_3$ at which the engine output is at Pea at time t4 in the direction to increase the engine output Pe, the controller 90 moves the operation point of the engine 70 to the operation point $OP_2$ on the optimal control curve a. Then, the controller 90 moves the operation point from $OP_2$ to $OP_4$, and to $OP_5$ along with the optimal control curve a shown in FIG. 5. As shown in FIG. 6, the engine fuel consumption rate Fe becomes minimum when the rotation speed of the engine 70 is $N_4$. After that, the engine fuel consummation rate Fe increases along with an increase in the engine output Pe along the optimal control curve a. Accordingly, as shown by the broken line in FIG. 4C, although the system fuel consumption rate Fs temporarily decreases due to a decrease in the engine fuel consumption rate Fe immediately after the start of the increase of the engine output Pe at time $t_4$, the engine fuel consumption rate Fs gradually increases thereafter, caused by an increase in the engine consumption rate Fe which is increased by continuously increasing the engine output Pe. Then, at time $t_5$, the operation point reaches at $OP_5$ where the engine fuel consumption rate Fe becomes $Fe_5$ which is equal to the system fuel consumption rate $Fs_1$ before the boost converter 20 was stopped at time $t_1$. Accordingly, when the engine output Pe is set equal to or over $Pe_5$, the system fuel consumption rate Fs of the hybrid vehicle 100 increases over the system fuel consumption rate $Fs_1$ before the boost converter 20 was stopped. Therefore, when the boost converter 20 is maintained at a halt, the system efficiency of the hybrid vehicle 100 is reduced compared to when the boost converter 20 is in operation. As described above, the threshold $Pe_5$ in the engine output adjustment program 95 indicates an engine output $Pe_5$ at which a system efficiency deterioration starts due to an increase of the engine fuel consumption rate Fe.

The controller 90 increases the engine output Pe in accordance with the decrease in the actual boost voltage VHr sensed by the high-voltage sensor 85 by executing steps S107 to S110 shown in FIG. 3 during a period from time $T_4$ to time $t_5$ at which the engine output Pe reaches the threshold $Pe_5$. When the engine output Pe reaches the threshold $Pe_5$, the controller 90 determines in step S110 shown in FIG. 3 that the engine output Pe is equal to or over the threshold and that the actual boost voltage VHr is not increasing but decreasing, and exits the engine output adjustment program 95 (engine output adjustment unit). As shown in step S111 in FIG. 3, the controller 90 executes the boost converter restart program 96 to restart the boost converter 20.

When restarted, the boost converter 20 boosts the DC low voltage VL from the battery 10 to DC high voltage VH and supplies the boosted voltage to the high-voltage electrical path 22 such that a normal operation described above with reference to FIG. 2 is performed with the smoothing capacitor 23 being charged and the actual boost voltage VHr being increased to the target boost voltage $VH_1$.

As described above, in the hybrid vehicle 100 according to the present embodiment, it becomes possible to maintain, for a long period, the system fuel consumption rate Fs of the hybrid vehicle 100 below a level applied before the boost converter 20 is stopped by increasing the generated power Pg of the first motor generator 50, which is a power generator, by using the engine 70, and thus the system efficiency of the hybrid vehicle 100 can be efficiently improved. Further, in the present embodiment, because the engine output Pe is temporarily increased after the boost converter 20 is stopped, and the DC high voltage VH is maintained at a constant level by decreasing the engine output Pe in accordance with the deviation of the actual boost voltage VHr sensed by the high-voltage sensor 85 from the target boost voltage $VH_1$ to balance between the generated power Pg of the first motor generator 50 and the power supply Pm supplied to the second motor generator 60, the DC high voltage VH can be maintained at a constant level with the minimum required engine output Pe. Therefore, the loss of the system of the hybrid vehicle 100 as a whole can be lowered to the minimum. Further, when the actual boost voltage VHr continues to decrease, the boost converter 20 is restarted to perform a normal operation so as to secure the drivability by restricting shortage of the output from the second motor generator 60.

Although, in the above described embodiment, the boost converter 20 is restarted only when the engine output Pe is set equal to or over the threshold with the actual boost voltage VHr decreasing, the boost converter 20 may be restarted by exiting the engine output adjustment program 95 and executing the boost converter restart program 96 (boost converter restart unit) even when the engine output Pe has not reached the threshold $Pe_5$ if the actual boost voltage VHr sensed by the high-voltage sensor 85 does not increase by increasing the engine output Pe and the actual boost voltage is maintained at or below the second threshold $VH_3$. The second threshold voltage $VH_3$ may be equal to or different from the first threshold voltage $VH_2$.

Next, with reference to FIGS. 8, and 9A to 9E, operations of the hybrid vehicle 100 according to an embodiment of the present invention are described concerning stopping the boost converter 20, adjusting the engine output Pe with the boost converter 20 at a halt when the absolute value of the power supply Pm (positive) supplied to the second motor generator 60 decreases below the absolute value of the generated power Pg (negative) generated by the first motor generator 50 immediately after the boost converter 20 is stopped, and restarting the boost converter 20. It should be noted that the operation points $OP_1$, and $OP_5$ to $OP_5$ in FIGS. 9C and 9E correspond to the operation points $OP_1$, and $OP_5$ to $OP_7$ of the engine 70 shown in FIGS. 5 and 6. The operations identical to those described above with reference to FIGS. 3, and 4A to 4E are described simply below.

As shown in FIGS. 9A to 9E, the hybrid vehicle 100 operates at time zero with the battery current $IB=I_1$, the DC high voltage VH (actual boost voltage VHr)=$VH_1$, the boost loss $Lc=Lc_0$, the engine output $Pe=Pe_1$, the system fuel consumption rate $Fs=Fs_0$, the engine fuel consumption rate $Fe=Fe_1$, the power supply Pm to the second motor generator $60=Pm_0$, and the generated power Pg of the first motor generator $50=Pg_0$, similarly to as shown in FIGS. 4A to 4E.

Figure 8:
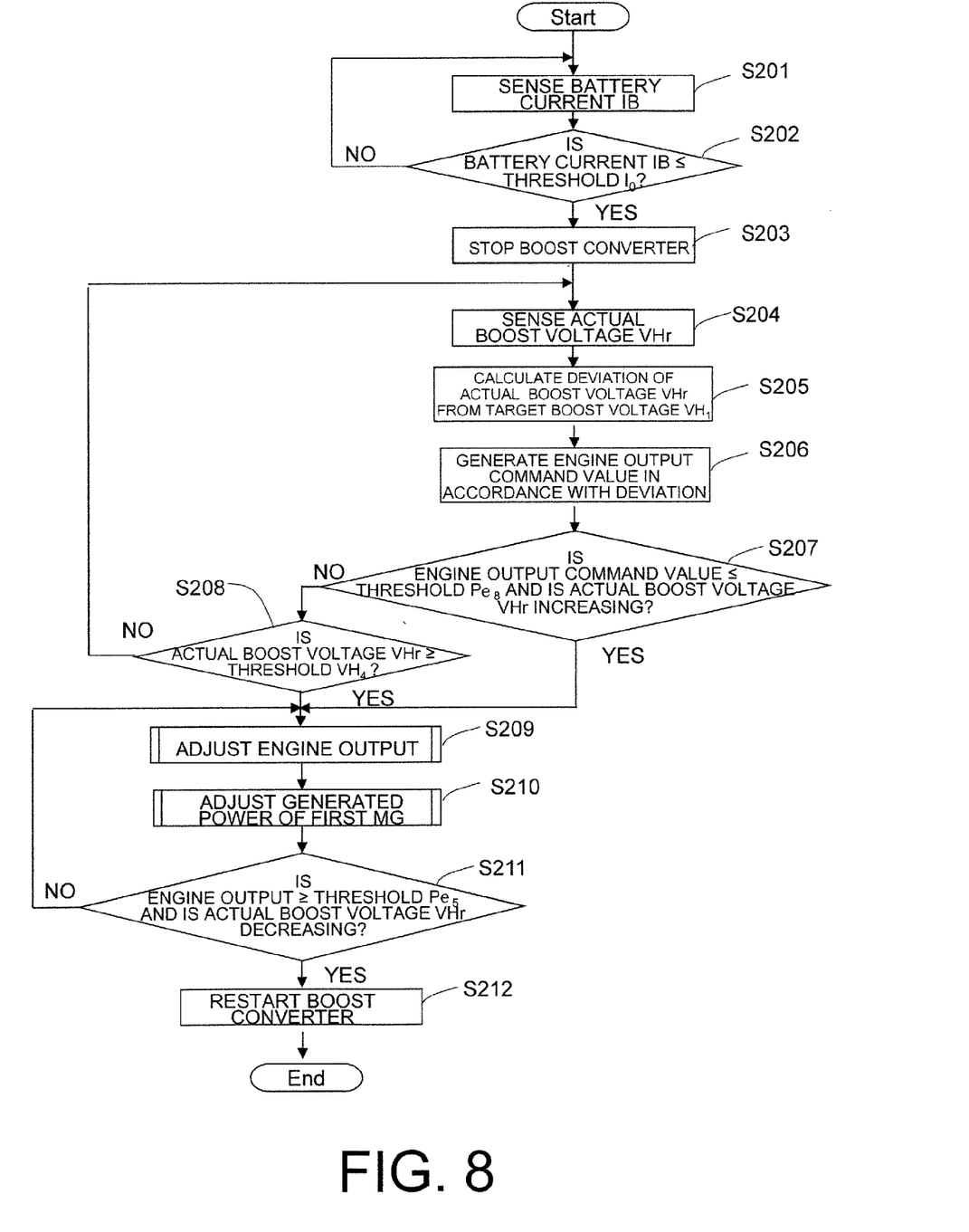
FIG. 8 is a flowchart showing other operations of a hybrid vehicle according to an embodiment of the present invention.

Similarly to steps S101 to S103 in FIG. 3, the controller 90 executes the boost converter stop program 94 (boost converter stop unit) shown in FIG. 1, and monitors the battery current IB by sensing the battery current IB with the high-voltage sensor 85 as shown in steps S201 and S202 in FIG. 8. When the battery current IB decreases down to or below the threshold $I_0$, the controller 90 stops the boost converter 20 as shown in step S203 in FIG. 8 and exits the boost converter stop program 94 (boost converter stop unit).

Figure 9A:
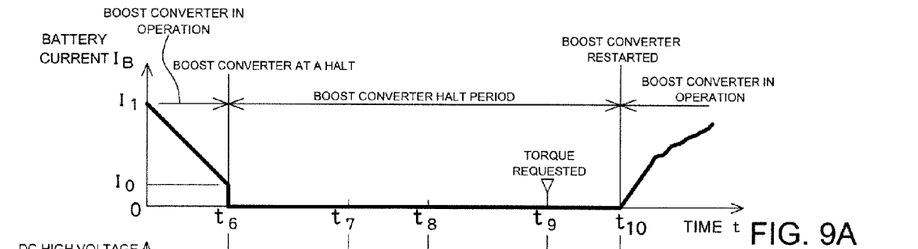
FIG. 9A is a graph showing changes in electric current of a battery over time during the operation shown in FIG. 8.
Figure 9B:
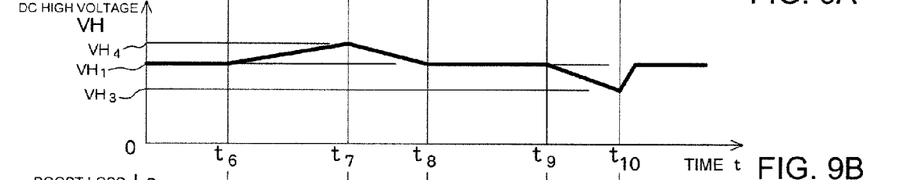
FIG. 9B is a graph showing changes in DC high voltage over time during the operation shown in FIG. 8.
Figure 9C:
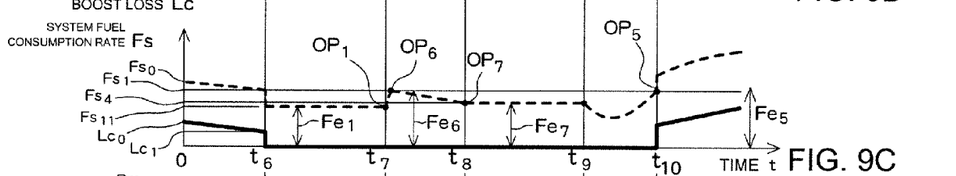
FIG. 9C is a graph showing changes in a boost loss and a system fuel consumption rate over time during the operation shown in FIG. 8.
Figure 9D:
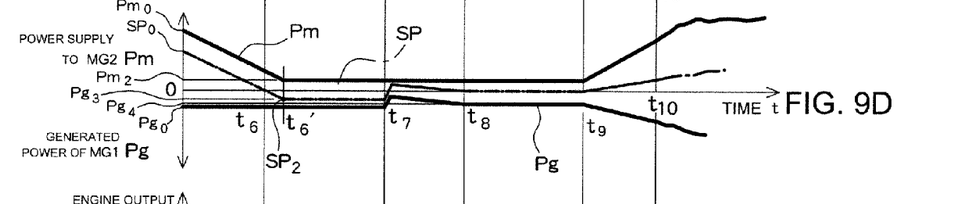
FIG. 9D is a graph showing changes in electric power supply to a second motor generator and generated power of a first motor generator over time during the operation shown in FIG. 8.

As shown in FIG. 9D, even when the boost converter 20 is stopped at time $T_6$, the power supply Pm supplied to the second motor generator 60 continues to decrease until the power supply Pm is equal to $Pm_2$ at time $t_6'$ immediately after time $t_6$. Therefore, at time $t_6'$, the absolute value (positive) of the power supply $Pm_2$ supplied to the second motor generator 60 is below the absolute value of the generated power $Pg_0$ (negative) of the first motor generator 50. Accordingly, the total power SP of both of the power is $SP_2(=Pm_2+Pg_0)$ which is slightly negative. Therefore, as shown in FIG. 9B, charging to the smoothing capacitor 23 is started from time $t_6$ at which the boost converter 20 is stopped such that the actual boost voltage VHr at both ends of the smoothing capacitor 23 is started to increase from the target boost voltage $VH_1$.

Figure 9E:
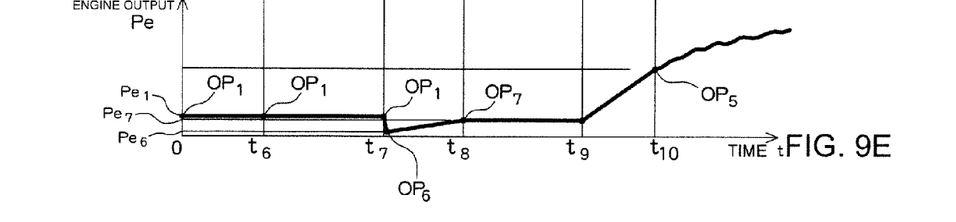
FIG. 9E is a graph showing changes in engine output over time during the operation shown in FIG. 8.

After exiting the boost converter stop program 94 shown in FIG. 1, the controller 90 starts executing the engine output adjustment program 95 (engine output adjustment unit) shown in FIG. 1 at time $t_6$ shown in FIG. 9E. As shown in step S204 in FIG. 8, the controller 90 senses the actual boost voltage VHr at both ends of the smoothing capacitor 23.

As shown in step S205 in FIG. 8, the controller 90 calculates a deviation of the actual boost voltage VHr sensed by the high-voltage sensor 85 from the target boost voltage $VH_1$. Then, as shown in step S206 in FIG. 8, the controller 90 calculates a sufficient amount of engine output Pe to be increased in accordance with the obtained deviation and generates an output command value to the engine. Because the actual boost voltage VHr sensed by the high-voltage sensor 85 at time $t_6$ is at the target boost voltage $VH_1$, the deviation becomes zero and the engine output command value to be output becomes the engine output $Pe_6$ at time $t_6$. Then, the controller 90 determines whether the engine output command value is equal to or below the threshold value $Pe_8$ and the actual boost voltage VHr is increasing.

The threshold $Pe_8$ is an engine output Pe such that the engine fuel consumption rate Fe becomes equal to the system fuel consumption rate $Fs_1$ applied before the boost converter 20 is stopped, and if the engine output Pe decreases to or below the $Pe_8$, the system fuel consumption rate Fs of the hybrid vehicle 100 increases over the system fuel consumption rate $Fs_1$ which is the same as before the boost converter 20 is stopped. Accordingly, when the engine output Pe decreases to or below the $Pe_8$ while maintaining the boost converter 20 at a halt, the system efficiency of the hybrid vehicle 100 is lowered compared to a case where the boost converter 20 is in operation. As described above, the threshold $Pe_8$ in the engine output adjustment program 95 is an engine output Pe at which the system efficiency starts to be lowered due to a decrease in the engine fuel consumption rate Fe.

When the engine output Pe is maintained at $Pe_1$ which is the same as at time $t_6$, the actual voltage VHr at both ends of the smoothing capacitor 23 gradually increases from the target boost voltage $VH_1$ as shown in the period between time $t_6$ to time $t_7$ in FIG. 9B such that the deviation (negative) of the actual boost voltage VHr from the target boost voltage $VH_1$ also gradually increases. In this way, the engine output command value calculated by the controller 90 in step S206 in FIG. 8 gradually decreases. When the engine command value becomes equal to or below the threshold $Pe_8$, the controller 90 skips the step S208 shown in FIG. 8 and proceeds to step S209 in which the controller 90 adjusts the engine output while no longer increasing the actual boost voltage VHr. As shown in step S210 in FIG. 8, the controller 90 adjusts the generated power Pg of the first motor generator 50. The engine output Pe and the generated power Pg of the first motor generator 50 are adjusted by changing the engine output Pe and the generated power Pg of the first motor generator 50 in accordance with the deviation of the actual boost voltage VHr from the target boost voltage $VH_1$ as shown in steps S107 to S109 in FIG. 3. After time $t_6$ in FIG. 9B, because the actual boost voltage VHr is over the target boost voltage $VH_1$, the deviation is negative. Accordingly, the controller 90 decreases the engine output Pe and the generated power Pg of the first motor generator 50.

Further, the controller 90 proceeds to step S208 in FIG. 8 when the engine command value is not equal to or below the threshold Pee, and determines whether the actual boost voltage VHr is equal to or over the third threshold voltage $VH_4$. When the actual boost voltage VHr is not equal to or over the third threshold voltage $VH_4$, the controller 90 monitors the actual boost voltage VHr by repeating the steps S204 to S208. When the actual boost voltage VHr becomes equal to or over the third threshold voltage $VH_4$, the controller 90 proceeds to steps S209 and S210 to decrease the engine output Pe and the generated power Pg of the first motor generator 50.

When the actual boost voltage VHr reaches the third threshold voltage $VH_4$ at time $t_7$, the deviation of the actual boost voltage VHr sensed by the high-voltage sensor 85 from the target boost voltage $VH_1$ is $(VH_1-VH_4)$ (in negative). Based on this deviation $(VH_1-VH_4)$, the controller 90 decreases the command value of the engine output Pe from $Pe_1$ at the operation point $OP_1$ at time $t_6$ towards $Pe_6$ at the operation point $OP_6$. In this way, as shown by the broken line in FIG. 9C, the engine fuel consumption rate Fs increases from $Fe_1$ at time $t_7$ towards $Fe_6$. Accordingly, the system fuel consumption rate Fs of the hybrid vehicle 100 also increases from $Fs_{11}$ (=$Fe_1$) at time $t_7$ towards $Fe_6$.

As shown in the period from immediately after time $t_7$ shown in FIG. 9E to time $t_8$, the actual boost voltage VHr decreases by reducing the engine output Pe. When the deviation of the actual boost voltage VHr from the target boost voltage $VH_1$ becomes closer to zero, the controller 90 repeats the steps S209 to S211 in FIG. 8 to increase the engine output Pe to $Pe_7$ in accordance with the deviation until the deviation becomes zero. At this time, the operation point of the engine 70 moves from the operation point $OP_6$ at time $t_7$ to the operation point $OP_7$. Because the engine fuel consumption rate Fe decreases from $Fe_6$ immediately after time $t_7$ to $Fe_7$ at time $t_8$, the system fuel consumption rate Fs of the hybrid vehicle 100 decreases for the amount of $(Fe_7-Fe_6)$. In other words, the system fuel consumption rate is improved for this amount.

As shown in FIGS. 9B, 9D, and 9E, when the engine output Pe becomes $Pe_1$ at time $t_8$, the generated power of the first motor generator 50 becomes $Pg_4$ such that the absolute value $Pg_4$ becomes equal to the absolute value of the power supply Pmt supplied to the second motor generator 60. In other words, the generated power Pg of the first motor generator 50 and the power supply Pm supplied to the second motor generator 60 are in a balanced state. Accordingly, the actual boost voltage VHr sensed by the high-voltage sensor 85 is maintained at the target boost voltage $VH_1$ after reaching at the target boost voltage $VH_1$ at time $t_8$.

When the accelerator pedal of the hybrid vehicle 100 is pressed by the driver at time $t_9$ in FIGS. 9A to 9E, similarly to at time $t_4$ in FIGS. 4A to 4E, the controller 90 outputs commands to increase the motor torque Tm of the second motor generator 60 and the engine torque Te of the engine 70. As shown in FIG. 9E, the engine output Pe increases in response to this command. Similarly to at time $t_5$ in FIG. 4E, when the engine output Pe reaches the threshold $Pe_5$ at time $t_{10}$ in FIG. 9E and the actual boost voltage VHr is decreasing as shown in FIG. 9B, the boost converter 20 is restarted as shown in step S212 in FIG. 8 to return to a normal control.

As described above, with the hybrid vehicle 100 according to the present embodiment, it becomes possible to effectively improve the system efficiency of the hybrid vehicle 100 by reducing the generated power Pg of the first motor generator 50 (power generator) driven by the engine 70 to balance with the power supply Pm supplied to the second motor generator 60 (electric motor) such that the system fuel consumption rate Fs of the hybrid vehicle 100 is maintained, for a long period, below a level applied before the boost converter 20 was stopped. Further, in the present embodiment, because the engine output Pe is temporarily reduced after the boost converter 20 is stopped, and then increased based on the deviation of the actual boost voltage VHr sensed by the high-voltage sensor 85 from the target boost voltage $VH_1$ so as to balance between the generated power Pg of the first motor generator 50 and the power supply Pm supplied to the second motor generator 60 to maintain the DC high voltage VH at a constant level, the DC high voltage VH can be maintained at a constant level by using a minimum required engine output Pe, restoring the loss of the system of the hybrid vehicle 100 as a whole to the minimum level. Further, when the actual boost voltage VHr continues to increase, the boost converter 20 is restarted to perform a normal operation in which the regenerative power output from the second motor generator 60 can be charged to the battery 10. Therefore, the delay in the regenerative brake can be restricted, and drivability can be ensured.

The present invention is not limited to the above embodiments. Various changes and modifications within the technical scope or essential spirit of the present invention defined in the claims are considered to be included in the present invention. For example, the configuration of the hybrid vehicle 100 is not limited to the configuration described with reference to FIG. 1 in which the output of the engine 70 is distributed to the first motor generator 50 and the output shaft 73 by the motive power distribution mechanism 72 and the second motor generator 60 is connected to the output shaft 73, but as shown in FIG. 20 in JP 2011-15603 A, the hybrid vehicle may have a configuration in which a power generator driven by an engine and an electric motor for driving the vehicle are provided, and a clutch is provided between the power generator and the speed-changing gears. The present invention may also be applied to a hybrid vehicle having a so-called "series-hybrid" driving mechanism in which a power generator for driving the vehicle is provided and an engine or a power generator driven by an engine is also provided independently from the vehicle driving mechanism. Further, although the above embodiments according to the present invention describe that the boost converter 20 is stopped when the battery current IB sensed by the battery current sensor 83 becomes equal to or below the threshold $I_0$, because the electric power output from the battery 10 (battery voltage VB×battery current IB) is equal to the electric power passing through the reactor 12 (DC low voltage VL×reactor current IL), and the battery voltage VB is equal to the DC low voltage VL at both ends of the filter capacitor 11, the boost converter 20 may be stopped when, in the place of the battery current IB, the reactor current IL sensed by the reactor current sensor 84 is equal to or below the threshold $I_0$.

What is claimed is:

1. A hybrid vehicle comprising:
    a battery;
    a boost converter connected to the battery;
    a first inverter connected to the boost converter;
    a second inverter connected to the boost converter and the first inverter;
    a power generator connected to the first inverter;
    an electric motor connected to the second inverter;
    an engine capable of driving the power generator; and
    a controller which starts and stops the boost converter,
    wherein the controller stops the boost converter when electric power transferred between the battery and the boost converter is equal to or below a predetermined threshold, and drives the power generator by the engine when an actual boost voltage of the boost converter reaches a predetermined threshold.

2. The hybrid vehicle according to claim 1, wherein
    the controller comprises an engine output adjustment unit which changes an engine output in accordance with a deviation of the actual boost voltage of the boost converter from a target boost voltage.

3. The hybrid vehicle according to claim 1, wherein
    the controller comprises a boost converter restart unit which restarts the boost converter when the actual boost voltage does not increase even with increase in engine output.

4. The hybrid vehicle according to claim 2, wherein
    the controller comprises a boost converter restart unit which restarts the boost converter when the actual boost voltage does not increase even with increase in engine output.

5. A hybrid vehicle comprising:
    a battery;
    a boost converter connected to the battery;
    a first inverter connected to the boost converter;
    a second inverter connected to the boost converter and the first inverter;
    a power generator connected to the first inverter;
    an electric motor connected to the second inverter;
    an engine capable of driving the power generator; and
    a controller which comprises a CPU and starts and stops the boost converter,
    wherein the controller executes, using the CPU, a boost converter stop program which stops the boost converter when electric power transferred between the battery and the boost converter is equal to or below a predetermined threshold, and drives the power generator by the engine when an actual boost voltage of the boost converter reaches a predetermined threshold.

6. A control method of a hybrid vehicle comprising:
    a battery;
    a boost converter connected to the battery;
    a first inverter connected to the boost converter;
    a second inverter connected to the boost converter and the first inverter;
    a power generator connected to the first inverter;
    an electric motor connected to the second inverter; and
    an engine capable of driving the power generator,
    wherein the boost converter is stopped when electric power transferred between the battery and the boost converter is equal to or below a predetermined threshold, and the power generator is driven by the engine when an actual boost voltage of the boost converter reaches a predetermined threshold.

* * * * *

UNITED STATES PATENT AND TRADEMARK OFFICE
CERTIFICATE OF CORRECTION

| | | |
|---|---|---|
| PATENT NO. | : 9,272,704 B2 | Page 1 of 1 |
| APPLICATION NO. | : 14/592349 | |
| DATED | : March 1, 2016 | |
| INVENTOR(S) | : Ryoji Sato and Masayoshi Suhama | |

It is certified that error appears in the above-identified patent and that said Letters Patent is hereby corrected as shown below:

Specification

In Column 1, Line 52, delete "Ina" and insert --In a--, therefor.

In Column 11, Line 41, after "Pe is not over the threshold", delete "Pas" and insert --Pe$_5$--, therefor.

In Column 12, Line 52, after "which the engine output is at", delete "Pea" and insert --Pe$_3$--, therefor.

In Column 14, Line 17, before "in FIGS. 9C and 9E", delete "OP$_5$" and insert --OP$_7$--, therefor.

In Column 15, Line 47, before "and determines whether", delete "Pee" and insert --Pe$_8$--, therefor.

In Column 16, Line 17, after "Pe becomes", delete "Pe$_1$" and insert --Pe$_7$--, therefor.

Signed and Sealed this
Twenty-fourth Day of May, 2016

Michelle K. Lee
*Director of the United States Patent and Trademark Office*